United States Patent
Cui et al.

(10) Patent No.: US 8,919,633 B2
(45) Date of Patent: Dec. 30, 2014

(54) SEAL ASSEMBLY AND METHOD FOR ASSEMBLING A TURBINE

(75) Inventors: Yan Cui, Greer, SC (US); William Edward Adis, Scotia, NY (US); Srikanth Chandrudu Kottilingam, Simpsonville, SC (US); Dechao Lin, Greer, SC (US); Michael Dennis Mack, Ballston, NY (US); Daniel Frederick Purdy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 469 days.

(21) Appl. No.: 13/343,296

(22) Filed: Jan. 4, 2012

(65) Prior Publication Data

US 2013/0168926 A1 Jul. 4, 2013

(51) Int. Cl.
*B23K 31/02* (2006.01)
*B23K 15/00* (2006.01)
*B23K 26/00* (2014.01)

(52) U.S. Cl.
USPC .. 228/182; 228/227; 219/121.14; 219/121.64

(58) Field of Classification Search
None
See application file for complete search history.

(56) References Cited

U.S. PATENT DOCUMENTS

| | | | | |
|---|---|---|---|---|
| 3,917,150 A * | 11/1975 | Ferguson et al. | | 228/159 |
| 5,110,033 A * | 5/1992 | Noone et al. | | 228/160 |
| 5,181,728 A * | 1/1993 | Stec | | 277/355 |
| 5,831,239 A * | 11/1998 | Matubara et al. | | 219/121.64 |
| 5,941,685 A * | 8/1999 | Bagepalli et al. | | 415/173.3 |
| 6,308,882 B1 * | 10/2001 | Shuster et al. | | 228/175 |
| 6,460,857 B1 * | 10/2002 | Turnquist et al. | | 277/355 |
| 6,681,486 B2 * | 1/2004 | Flower | | 29/889.2 |
| 7,705,265 B2 * | 4/2010 | Asakura et al. | | 219/121.64 |
| 8,051,563 B2 * | 11/2011 | Adis et al. | | 29/888.3 |
| 8,759,679 B2 * | 6/2014 | Yoshida et al. | | 174/94 R |
| 2002/0189096 A1 * | 12/2002 | Flower | | 29/888.3 |
| 2003/0001339 A1 * | 1/2003 | Inoue | | 277/355 |
| 2003/0006559 A1 * | 1/2003 | Inoue | | 277/355 |
| 2003/0042682 A1 * | 3/2003 | Inoue | | 277/355 |
| 2007/0132189 A1 * | 6/2007 | Short et al. | | 277/355 |
| 2008/0217859 A1 * | 9/2008 | Addis | | 277/303 |
| 2008/0315529 A1 * | 12/2008 | Addis | | 277/355 |
| 2011/0175296 A1 * | 7/2011 | Bowsher | | 277/355 |
| 2011/0188927 A1 * | 8/2011 | Mizrahi | | 403/271 |
| 2011/0306949 A1 * | 12/2011 | Specht et al. | | 604/528 |
| 2012/0251303 A1 * | 10/2012 | Zheng et al. | | 415/173.3 |
| 2012/0288361 A1 * | 11/2012 | Lu et al. | | 415/174.2 |
| 2013/0008027 A1 * | 1/2013 | Franchet et al. | | 29/889.71 |
| 2013/0062834 A1 * | 3/2013 | Franceschini | | 277/355 |

FOREIGN PATENT DOCUMENTS

DE 2462726 B1 * 10/1980
JP 63-317267 A * 12/1988

* cited by examiner

*Primary Examiner* — Kiley Stoner
(74) *Attorney, Agent, or Firm* — Cantor Colburn LLP

(57) ABSTRACT

According to one aspect of the invention, a method for assembling a turbine includes placing a middle layer between a first and second outer member, wherein the middle layer includes a non-continuous layer of material and the first and second outer members each include a member of continuous material and welding a primary joint between the middle layer, first outer member and second outer member, the primary joint extending through the first outer member, the middle layer and at least a portion of the second outer member. The method also includes welding a secondary joint between the middle layer and first outer member, the secondary joint extending through the first outer member and at least a portion of the middle layer.

11 Claims, 4 Drawing Sheets

US 8,919,633 B2

SEAL ASSEMBLY AND METHOD FOR ASSEMBLING A TURBINE

BACKGROUND OF THE INVENTION

The subject matter disclosed herein relates to turbines. More particularly, the subject matter relates to seals between components of turbines.

In a gas turbine, a combustor converts chemical energy of a fuel or an air-fuel mixture into thermal energy. The thermal energy is conveyed by a fluid, often compressed air from a compressor, to a turbine where the thermal energy is converted to mechanical energy. Leakage of the compressed air between compressor parts or components causes reduced power output and lower efficiency for the turbine. Leaks may be caused by thermal expansion of certain components and relative movement between components during operation of the gas turbine. Accordingly, reducing fluid leaks, such as gas/air leaks, between components can improve efficiency and performance of the turbine. Seals may be placed between turbine components to reduce leakage. The seals should be durable and able to withstand elevated pressures and temperatures while also allowing for relative movement of components.

BRIEF DESCRIPTION OF THE INVENTION

According to one aspect of the invention, a method for assembling a turbine includes placing a middle layer between a first and second outer member, wherein the middle layer includes a non-continuous layer of material and the first and second outer members each include a member of continuous material and welding a primary joint between the middle layer, first outer member and second outer member, the primary joint extending through the first outer member, the middle layer and at least a portion of the second outer member. The method also includes welding a secondary joint between the middle layer and first outer member, the secondary joint extending through the first outer member and at least a portion of the middle layer.

According to another aspect of the invention, a seal assembly includes a brush layer, a first plate disposed on a first side of the brush layer and a primary joint coupling the brush layer and first plate, wherein the primary joint is formed by an electron beam weld. The assembly also includes a secondary joint coupling the layer and first plate, wherein the secondary joint is formed by an electron beam weld that overlaps at least a portion of the primary joint and removes a structural flaw in the primary joint.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
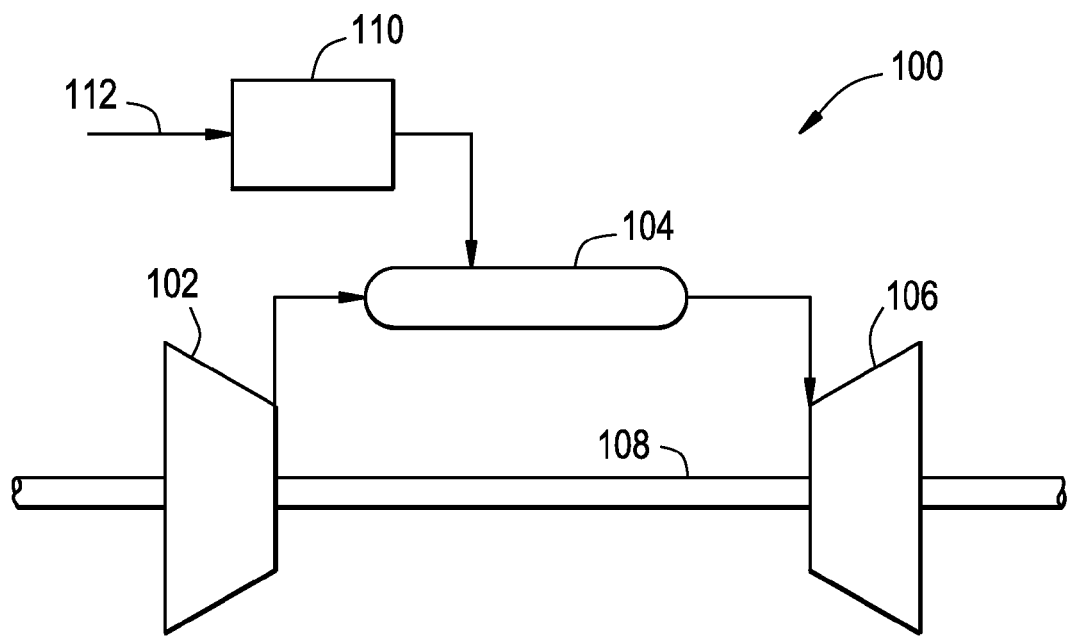
FIG. 1 is a schematic drawing of an embodiment of a turbine engine, including a combustor, fuel nozzle, compressor and turbine.

FIG. 1 is a schematic diagram of an embodiment of a turbine system 100, such as a gas turbine. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. The compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the engine. For example, fuel nozzles 110 are in fluid communication with an air supply and a fuel supply 112. The fuel nozzles 110 create an air-fuel mixture, and discharge the air-fuel mixture into the combustor 104, thereby causing a combustion that heats a pressurized gas. The combustor 104 directs the hot pressurized exhaust gas through a transition piece into a turbine nozzle (or "stage one nozzle") and then a turbine bucket, causing turbine 106 rotation. The rotation of turbine 106 causes the shaft 108 to rotate, thereby compressing the air as it flows into the compressor 102. The turbine components or parts are joined by seals or seal assemblies configured to allow for thermal expansion and relative movement of the parts while preventing leakage of the gas/air as it flows through the turbine 106. Specifically, reducing leakage of compressed gas flow between components in the compressor increases the volume hot gas flow along the desired path, enabling work to be extracted from more of the hot gas, leading to improved turbine efficiency. Seal assemblies for placement between compressor parts are discussed in detail below with reference to FIGS. 2-4.

As used herein, "downstream" and "upstream" are terms that indicate a direction relative to the flow of working fluid through the turbine. As such, the term "downstream" refers to a direction that generally corresponds to the direction of the flow of working fluid, and the term "upstream" generally refers to the direction that is opposite of the direction of flow of working fluid. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. Although the following discussion primarily focuses on gas turbines, the concepts discussed are not limited to gas turbines and may apply to any suitable machinery, including steam turbines. Accordingly, the discussion herein is directed to gas turbine embodiments, but may apply to other turbine systems.

Figure 2:
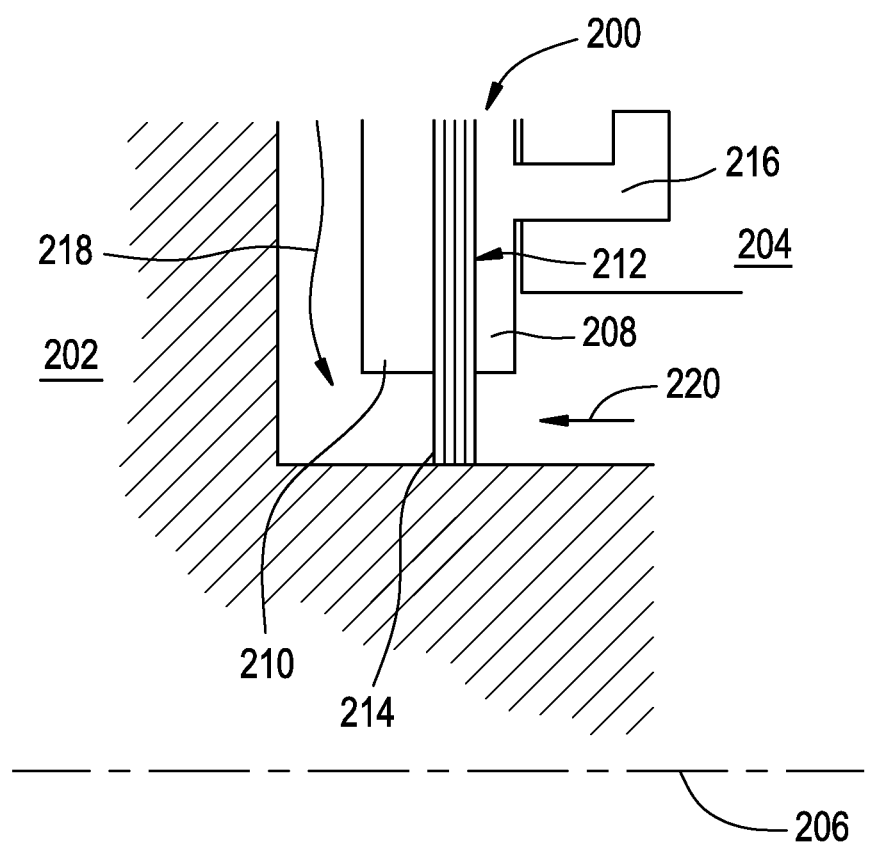
FIG. 2 is a side view of an embodiment of a seal assembly.

FIG. 2 is a side view of an embodiment of a seal assembly 200 in a system, such as turbine system 100. The seal assembly 200 reduces or restricts a fluid flow between rotating and non-rotating components, such as rotor 202 and stator 204.

The rotor 202 and stator 204 are components disposed about a turbine axis 206. The seal assembly 200 includes a first plate 208 and a second plate 210 (also referred to as "outer members") with a brush layer 212 (also referred to as "middle layer") disposed between the plates. In an embodiment, the seal assembly 200 is coupled to the stator 204 via a coupling 216 extending from the first plate 208 into the stator 204. The brush layer 212 includes one or more flexible members, such as bristles 214, arranged to reduce flow across the brush layer 212. For example, the brush layer 212 provides restriction or a barrier for flow of fluid 218, such as cool air, across the brush layer 212. In an aspect, the brush layer 212 is substantially flexible to enable sealing for components that move relative to one another, such as the rotating rotor 202 and non-rotating stator 204. The flexibility of brush layer 212 also allows for relative movement of parts caused by various factors, such as machine vibration and thermal expansion. Further, the brush layer 212 is configured to reduce or restrict leaking of hot gas 220 across the brush layer 212, thereby enabling more work to be extracted from the hot gas 220. In addition, by reducing flow of fluid 218 into the hot gas 220, the temperature of hot gas 220 is maintained, also enabling more work to be extracted by the turbine. As discussed below, the exemplary seal assembly 200 is assembled using an electron beam (EB) welding process to form a plurality of joints that couple or connect the first plate 208, second plate 210 and brush layer 212. In embodiments, the weld forms joints that run circumferentially along the turbine and couple the brush layer 212 to the first and second plates 208 and 210 in a sandwich fashion.

Figure 3:
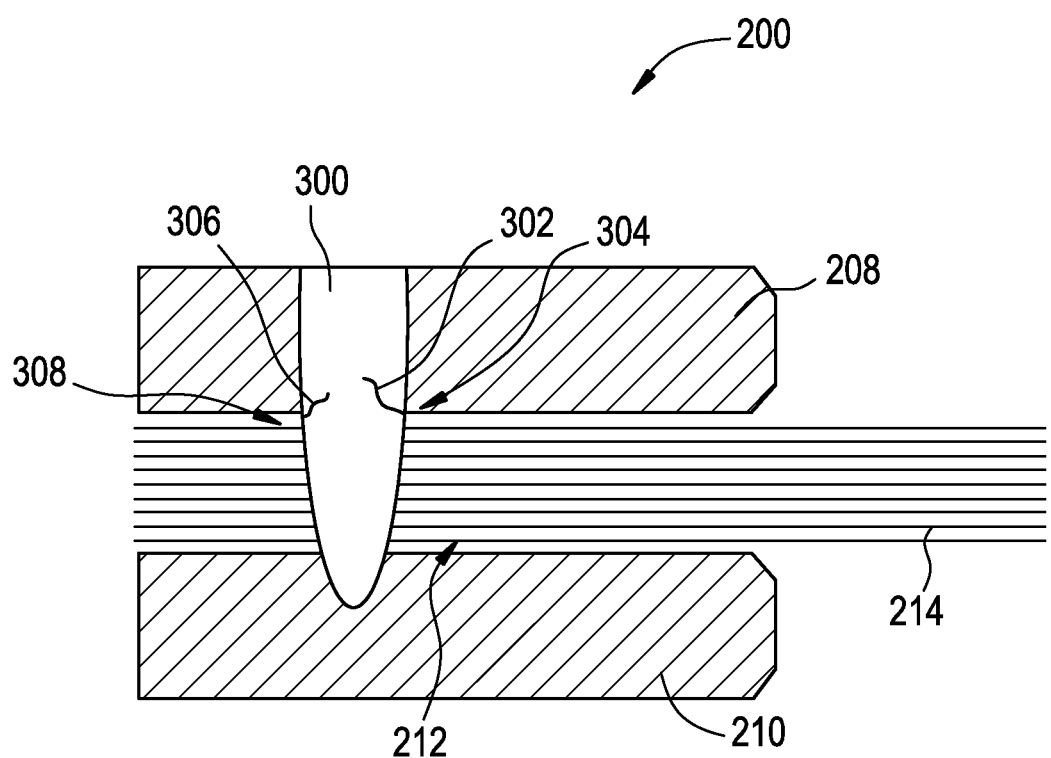
FIG. 3 is a detailed sectional side view of the seal assembly of FIG. 2 shown in a first stage of an assembly process.

FIG. 3 is a detailed sectional side view of the seal assembly 200. The embodiment illustrates the seal assembly 200 at a selected stage of an assembly process. The seal assembly 200 includes the brush layer 212 disposed between the first plate 208 and the second plate 210. A primary joint 300 is formed between the brush layer 212, first plate 208 and second plate 210. The primary joint 300 may be formed by any suitable process, such as the EB welding process. The EB welding process forms the primary joint 300 transversely through the brush layer 212 and plates 208 and 210, thereby forming a nail or bullet cross-sectional shaped joint that couples the parts together for placement in a turbine assembly. The primary joint 300 is configured to withstand elevated temperatures and pressures within the turbine, thereby providing a reduction in fluid flow and leakage between turbine regions. In an embodiment, one or more structural defects, such as cracks 302 and 306, may be formed during welding of the primary joint 300. The cracks 302 and 306 form between the brush layer 212 and first plate 208, proximate interfaces 304 and 308, respectively. The cracks 302 and 306 can form due to various factors. In one embodiment, the cracks 302 and 306 form due to the transition from a continuous member in first plate 208 to a non-continuous layer of material in brush layer 212. The exemplary first plate 208 is described as a continuous member because the plate is a member of substantially solid or continuous durable material, such as a steel alloy or stainless steel. The brush layer 212 is described as non-continuous due the layer being formed from adjacent bristles 214 which have spacing between bristles or bristle wires, thereby causing the layer to be non-continuous. The bristles 214 may have any suitable cross-sectional shape, such as circles, hexagons and/or any suitable polygons. Exemplary bristles 214 are made from a suitable durable wear resistant material, such as a Cobalt-based alloy, nickel, stainless steel or Nitronic. In an embodiment, differing materials of first plate 208 (stainless steel) and brush member 212 (Cobalt-based alloy) can cause development of cracks 302 and 306 during formation of the primary joint 300.

Figure 4:
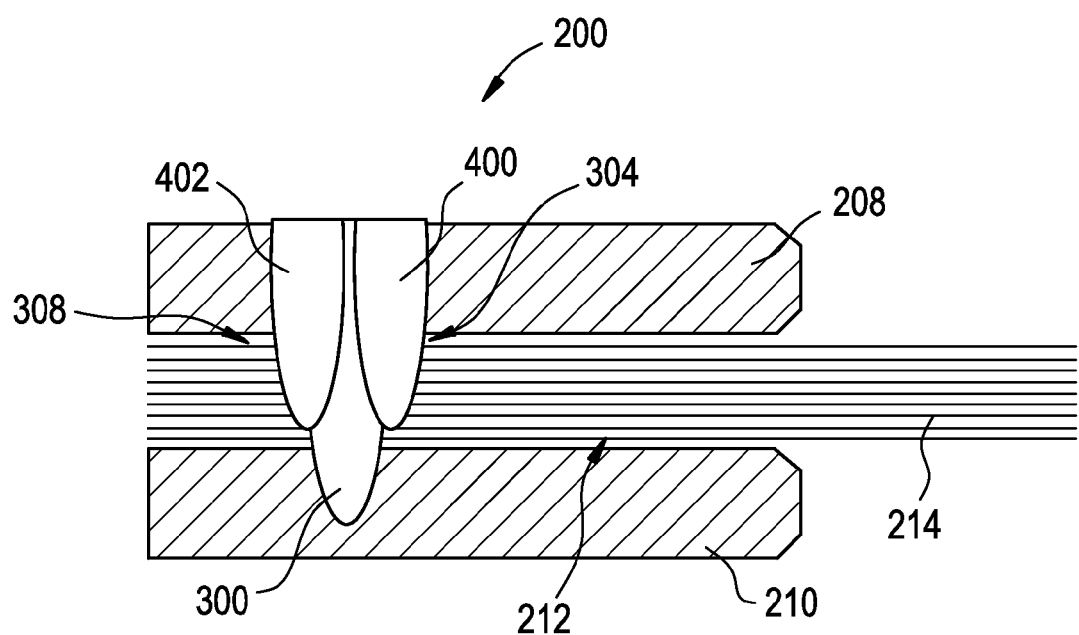
FIG. 4 is a detailed sectional side view of the seal assembly of FIG. 3 shown in a second stage of the assembly process.

FIG. 4 is a detailed sectional side view of the seal assembly 200 after the stage shown in FIG. 3. As depicted, a secondary joint 400 and tertiary joint 402 are formed in the seal assembly 200. A suitable process, such as EB welding, may be used to form the secondary joint 400 and tertiary joint 402. The secondary joint 400 and tertiary joint 402 couple or join the first plate 208 and brush layer 212. In an embodiment, the secondary joint 400 and tertiary joint 402 are adjacent to and overlap a portion of the primary joint 300. The secondary joint 400 and tertiary joint 402 are disposed adjacent to the primary joint 300 and "heal" or remove the cracks 302 and 306. In an embodiment, the secondary joint 400 and tertiary joint 402 are formed during the EB welding process with a lower heat input, and corresponding lower stress on the joints, than used to form primary joint 300. In another embodiment, the primary joint 300, secondary joint 400 and tertiary joint 402 are formed by a laser welding process. Accordingly, in an example the depicted process and assembly may be formed by laser welds instead of the EB welds discussed herein.

The secondary and tertiary joints 400 and 402 each provide a benign microstructure in the joints due to different and lower dilution levels between first plate 208 and brush member 212, as compared to the primary joint 300. In an aspect, the primary joint 300 penetrates through the first plate 208, the entire thickness of the brush member 212 and a portion of the second plate 210. During the first pass of EB welding the primary joint 300, the bristle material (e.g., Cobalt-based alloy) melts and mixes with the steel alloy material of the plates 208 and 210. In embodiments, the mixing of the bristle material with the steel alloy of the plates creates a chemistry that is prone to cracking. Accordingly, in an embodiment, when making EB welding passes to form the secondary and tertiary joints 400 and 402, the joints only penetrate the first plate 208 and a portion of the brush member 212, resulting in a reduced amount of the bristle material in the joints 400 and 402. As a result, in an embodiment, the chemistry and microstructure of the secondary and tertiary joints 400 and 402 is less prone to cracking. In another embodiment, the secondary and tertiary joints 400 and 402 each may extend through the first plate 208, brush layer 212 and at least a portion of the second plate 210. Further, in one embodiment, the secondary and tertiary joints 400 and 402 may extend the same distance as the primary joint 300 into the second plate. The addition of the secondary and tertiary joints 400 and 402 also reduces stress at the joints while improving chemistry to reduce formation of structural defects. In embodiments, the secondary and tertiary joints 400 and 402 heal one or more cracks 302 and 306, respectively, that form during the welding pass for the primary joint 300. Thus, the resulting primary, secondary and tertiary joints 300, 400, 402 are reinforced to enable the seal assembly 200 to withstand extreme temperatures and wear.

In embodiments, a single secondary joint 400 may be formed in the seal assembly 200 to heal the primary joint 300 and provide improved durability. For example, the secondary joint 400 is formed on one side of the primary joint 300 where crack formation is more likely, due to application specific factors, such as fixturing and/or assembly configuration. The exemplary assembly and method may be used to couple or assemble a continuous member to a non-continuous layer or member used in a machine or apparatus, wherein the depicted method and assembly provide a healed joint to couple a non-continuous layer to a continuous member.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for assembling a turbine, the method comprising:
   placing a middle layer between a first and second outer member, wherein the middle layer comprises a non-continuous layer of material and the first and second outer members each comprise a member of continuous material;
   welding a primary joint between the middle layer, first outer member and second outer member, the primary joint extending through the first outer member, the middle layer and at least a portion of the second outer member; and
   welding a secondary joint between the middle layer and first outer member subsequent to welding the primary joint, the secondary joint extending through the first outer member and at least a portion of the middle layer, wherein the secondary joint overlaps at least a portion of the primary joint on a first side of the primary joint;
   welding a tertiary joint between the middle layer and first outer member subsequent to welding the primary joint, the tertiary joint extending through the first outer member and at least a portion of the middle layer, wherein the tertiary joint overlaps at least a portion of the primary joint on a second side of the primary joint, the second side opposite the first side.

2. The method of claim 1, wherein welding the primary joint comprises forming a crack in the primary joint and wherein forming the secondary joint removes the crack in the primary joint.

3. The method of claim 1, wherein welding the secondary joint comprises forming the secondary joint to overlap at least a portion of the primary joint.

4. The method of claim 1, wherein welding the primary joint comprises forming a crack in the primary joint and wherein welding the tertiary joint removes the crack in the primary joint.

5. The method of claim 1, wherein the middle layer comprises a plurality of bristles that form a seal member and wherein the first and second outer members each comprise a plate and wherein the plurality of bristles comprise one of a Cobalt-based alloy, nickel and stainless steel and wherein the plates of the first and second outer members each comprise a steel alloy.

6. The method of claim 1, wherein welding the primary joint comprises electron beam welding or laser welding and wherein welding the secondary joint and the tertiary joint comprises electron beam welding or laser welding.

7. A method for assembling a turbine, the method comprising:
   placing a brush layer between a first and second plate, wherein the layer comprises a plurality of bristles;
   forming a primary joint between the brush layer, first plate and second plate, wherein forming the primary joint comprises welding to form the primary joint that extends through the first plate, the brush layer and at least a portion of the second plate;
   forming a secondary joint between the brush layer and first plate subsequent to forming the primary joint, wherein forming the secondary joint comprises welding to form the secondary joint that overlaps at least a portion of a first side of the primary joint and wherein the secondary joint removes a structural flaw in the primary joint; and
   forming a tertiary joint between the brush layer and first plate subsequent to forming the primary joint, wherein forming the tertiary joint comprises welding to form the tertiary joint that overlaps at least a portion of a second side of the primary joint, the second side opposite the first side, the tertiary joint extending through the first plate and at least a portion of the brush layer.

8. The method of claim 7, wherein the structural flaw comprises a crack.

9. The method of claim 7, wherein the secondary joint extends through the first plate and at least a portion of the brush layer.

10. The method of claim 7, wherein the plurality of bristles comprise a Cobalt-based alloy and wherein the first and second plates each comprise a steel alloy.

11. The method of claim 7, wherein forming the primary joint comprises one of electron beam welding or laser welding and wherein forming the secondary joint and the tertiary joint comprises electron beam welding or laser welding.

* * * * *